United States Patent [19]

Lee

[11] 4,411,255
[45] Oct. 25, 1983

[54] PASSIVE THERMAL STORAGE WALL STRUCTURES FOR HEATING AND COOLING BUILDINGS

[76] Inventor: Kenneth S. Lee, 2046 Mershon, Ann Arbor, Mich. 48104

[21] Appl. No.: 222,896

[22] Filed: Jan. 6, 1981

[51] Int. Cl.³ .................................................. F24J 3/02
[52] U.S. Cl. .................................. 126/429; 126/431; 126/434; 98/31
[58] Field of Search ............................... 126/429–431, 126/434–436, 400; 165/48 S, 53, 57; 98/31

[56] References Cited

U.S. PATENT DOCUMENTS

| | | | |
|---|---|---|---|
| 3,299,795 | 1/1967 | Teixeira | 98/31 |
| 4,006,856 | 2/1977 | Nilsson | 126/429 |
| 4,050,508 | 9/1977 | Buckley | 165/32 |
| 4,151,954 | 5/1979 | Jacobs | 126/429 X |
| 4,223,666 | 9/1980 | Wasserman | 126/400 X |
| 4,259,401 | 3/1981 | Chahroudi et al. | 126/429 X |
| 4,286,420 | 9/1981 | Pharmakidis | 126/430 X |
| 4,295,415 | 10/1981 | Schneider, Jr. | 126/428 |

Primary Examiner—William E. Tapolcai
Attorney, Agent, or Firm—James M. Deimen

[57] ABSTRACT

The invention comprises improvements in masonry block or precast concrete exterior wall construction that integrally combine means for passive heating and cooling of a building. Both thermal storage and heat exchange with the external environment are provided passively by means of thermal storage materials located within the wall structure and vertical conduits formed in the wall structure. The walls are constructed to form parallel vertical siphons to heat or cool interior air by means of cooling or heating exterior air either simultaneously or intermittently depending upon the relative external and building interior temperatures as well as the internal wall temperature.

The masonry blocks are modified configurations of the blocks used for conventional construction and are laid up in basically the same manner with the same patterns as conventional construction. At the top and bottom of the walls, however, specialized blocks are laid to provide ingress and egress for the movement of air vertically through the wall.

In an alternative embodiment the walls are constructed to form a passive air exchange for the structure. The parallel vertical siphons heat or cool incoming air by means of cooling or heating outgoing air. Thus, in this embodiment air as well as heat are exchanged between the exterior environment and the interior of the structure.

22 Claims, 40 Drawing Figures

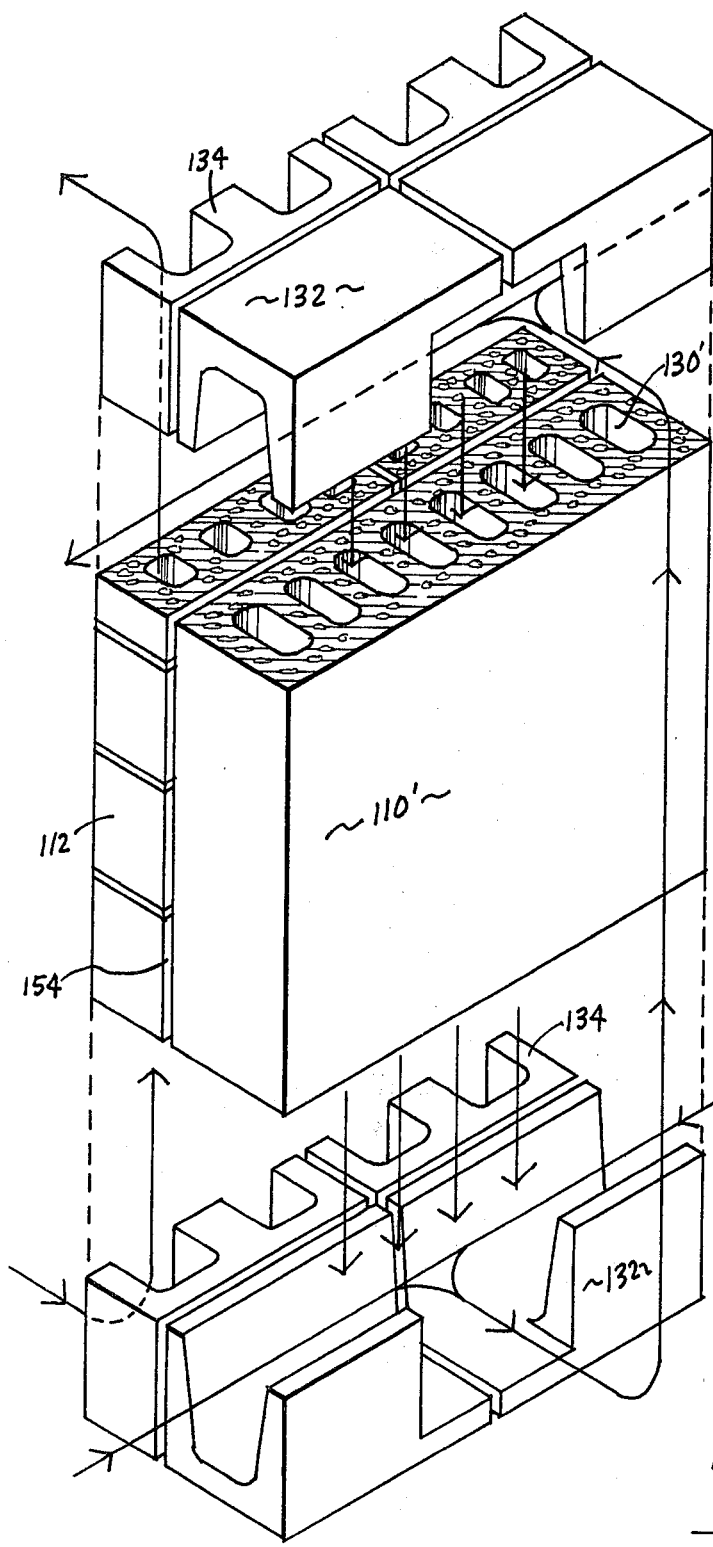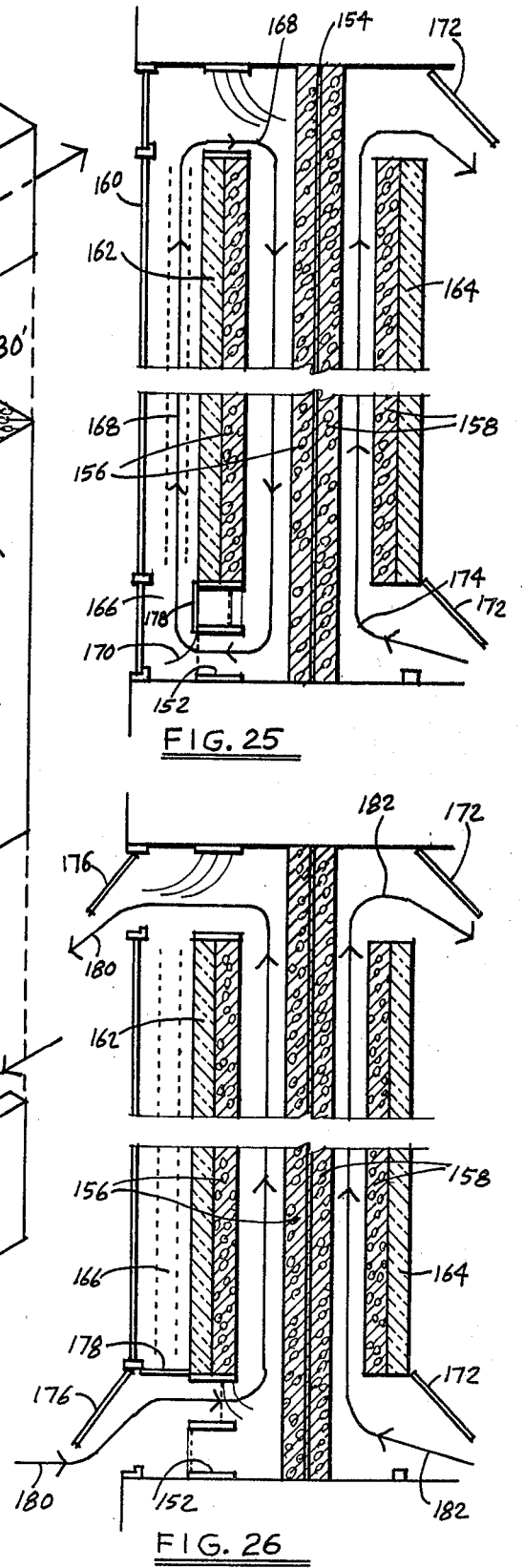
FIG. 24
FIG. 25
FIG. 26

PASSIVE THERMAL STORAGE WALL STRUCTURES FOR HEATING AND COOLING BUILDINGS

BACKGROUND OF THE INVENTION

The field of the invention pertains to passive thermal storage and heat exchange wall systems for heating and cooling structures, in particular, structures having masonry block or precast concrete exterior walls.

Masonry block and precast concrete panels are common materials for the construction of exterior structural walls for buildings. With the increased attention being paid to both insulating walls and eliminating the leakage of heated and cooled air from a structure to minimize energy costs for buildings, the normal exchange of air in many structures is being reduced to a degree that may produced detrimental effects to the health of individuals living and working within such structures.

Forced air heat exchange systems are commonly used as a part of the heating and air conditioning systems. Such systems provide fresh air to the structure at the cost of power for the ventilation system and of substantially increased mechanical and electrical complexity. The increasing complexity of such air handling systems is resulting in an ever increasing percentage of building cost being attributable to the mechanical and electrical building systems. As a result more attention is being paid to passive heating and cooling means for structures. Such systems eliminate or greatly reduce the need for mechanical and electrical fans and controls relying instead upon the integration of the building with the surrounding environment to best take advantage of the heating and cooling available naturally. Perhaps the oldest examples of such structures are located in the Mid-East to take advantage of any movement of the desert winds to cool the structures.

More recently structures such as Trombe walls and water walls have been used. Movable insulation to prevent heat loss at night has been added to such installations, however, difficulties arise in attempting to adequately control the heat radiated to the interior of the building. Another passive thermal storage means comprises rock storage bins. Such bins, however, can not always be located to maximum advantage and use large amounts of valuable interior floor space or basement space.

A different approach has been the thermal siphon and air collector whereby interior air is heated to an exterior glazed chamber and passively circulated through the interior of the structure. Such an approach, however, provides no thermal storage beyond the structure interior floor, walls and furnishings and therefore can result in undesirable interior temperature fluctuations.

Applicant's improvements as disclosed below are directed toward overcoming the difficulties arising from the prior art approaches to passive heating and cooling of structures.

SUMMARY OF THE INVENTION

The invention comprises improvements in masonry block or precast concrete exterior wall construction that integrally combine means for passive heating and cooling of a building. Both thermal storage and heat exchange with the external environment are provided passively by means of thermal storage materials located within the wall structure and vertical conduits formed in the wall structure. The walls incorporate parallel vertical siphons to heat or cool interior air by means of cooling or heating exterior air either simultaneously or intermittently depending upon the relative external and building interior temperatures as well as the internal wall temperature.

The masonry blocks are modified configurations of the blocks used for conventional construction and are laid up in basically the same manner with the same patterns as conventional construction. At the top and bottom of the walls, however, specialized blocks are laid to provide ingress and egress for the movement of air vertically through the wall. A variety of thermal storage mediums may be used within the walls including the block material itself, rock, water or a suitable phase change material. The thermal storage material is placed in the wall as it is constructed and is placed or formed so as to retain vertical conduits for the flow of air therethrough.

In an alternative embodiment the walls are constructed to form a passive air exchanger for the structure. The parallel vertical siphon heat or cool incoming air by means of cooling or heating outgoing air. Thus, in this embodiment air as well as heat are exchanged between the exterior environment and the interior of the structure.

The completed walls and thermal siphons are controlled by simple flaps in appropriate vents acting as one way valve to automatically prevent reversal of the siphon flow and by dampered vents that may be manually or thermostatically controlled to adjust the flow of heated or cooled air into the structure interior.

In the alternative air exchange embodiment additional dampered vents allow the wall structure to provide cool fresh air in summer as well as heated fresh air in winter both from outside the building without the need for active powered ventilation means.

The wall structures are externally insulated and can function as loadbearing walls of the building. The wall structures require minimal floor space beyond that required for conventional loadbearing walls and eliminate the need for the movable insulation panels of other types of thermal storage walls. By simultaneously providing a natural convection heat exchanger and thermal storage, applicant's wall significantly reduces air temperature fluctuations in the building and permits convenient air flow adjustment to maintain a comfortable interior temperature despite large changes in solar heat input to an air heating chamber outside the wall. Applicant's wall structure can simultaneously absorb and discharge heat from the thermal mass of the wall as needed and is not limited to the separate discharge and charge cycles of many prior art thermal storage devices.

Another advantage of applicant's wall accrues from the combination of a solar air collector separated from the thermal storage wall by an insulation barrier. The air collector has minimum mass thereby heating up the air therein very quickly upon the application of sunshine. Warm air is quickly transmitted to the wall behind the insulation. Short periods of sunshine can thereby be effectively utilized. The insulation barrier, however, prevents the loss of heat to the air collector and through the glazing when there is insufficient sunshine to warm the air collector.

Another advantage accrues from the optimal use of vertical rock thermal storage means integrated into the building wall as well as other very simple and inexpensive means of augmenting the thermal storage capacity of the building masonry or precast wall.

DESCRIPTION OF THE DRAWINGS

FIG. 15b is a top view of a vent row constructed with the block of FIG. 15a;

FIG. 16b is a top view of a vent row constructed with the block of FIG. 16a;

FIG. 24 is an exploded perspective view of the alternative version of FIG. 23 formed with a precast concrete section;

FIG. 25 is a schematic section of the walls of FIGS. 23 and 24 illustrating winter daytime operation;

FIG. 26 is a schematic section of the walls of FIGS. 23 and 24 illustrating summer nighttime operation;

DESCRIPTION OF THE PREFERRED EMBODIMENTS

Figure 1:
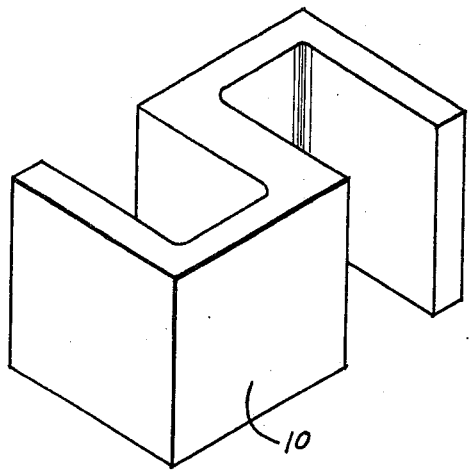
FIGS. 1 through 6 are perspective views of masonry blocks for a thermal storage wall.
Figure 5:
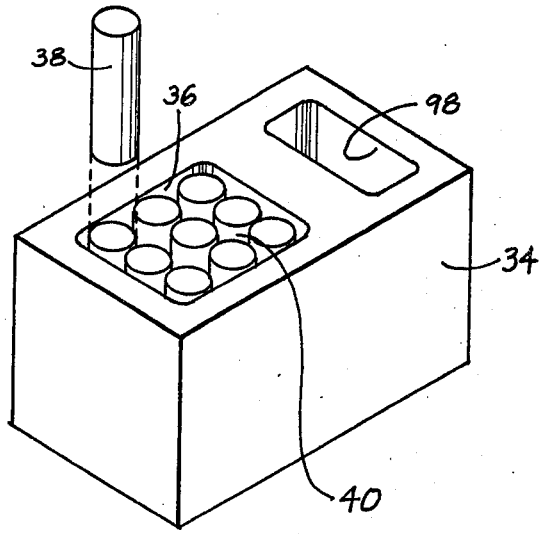
Figure 6:
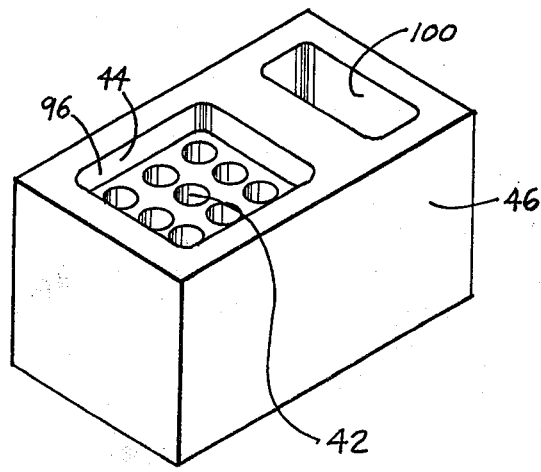
Figure 7:
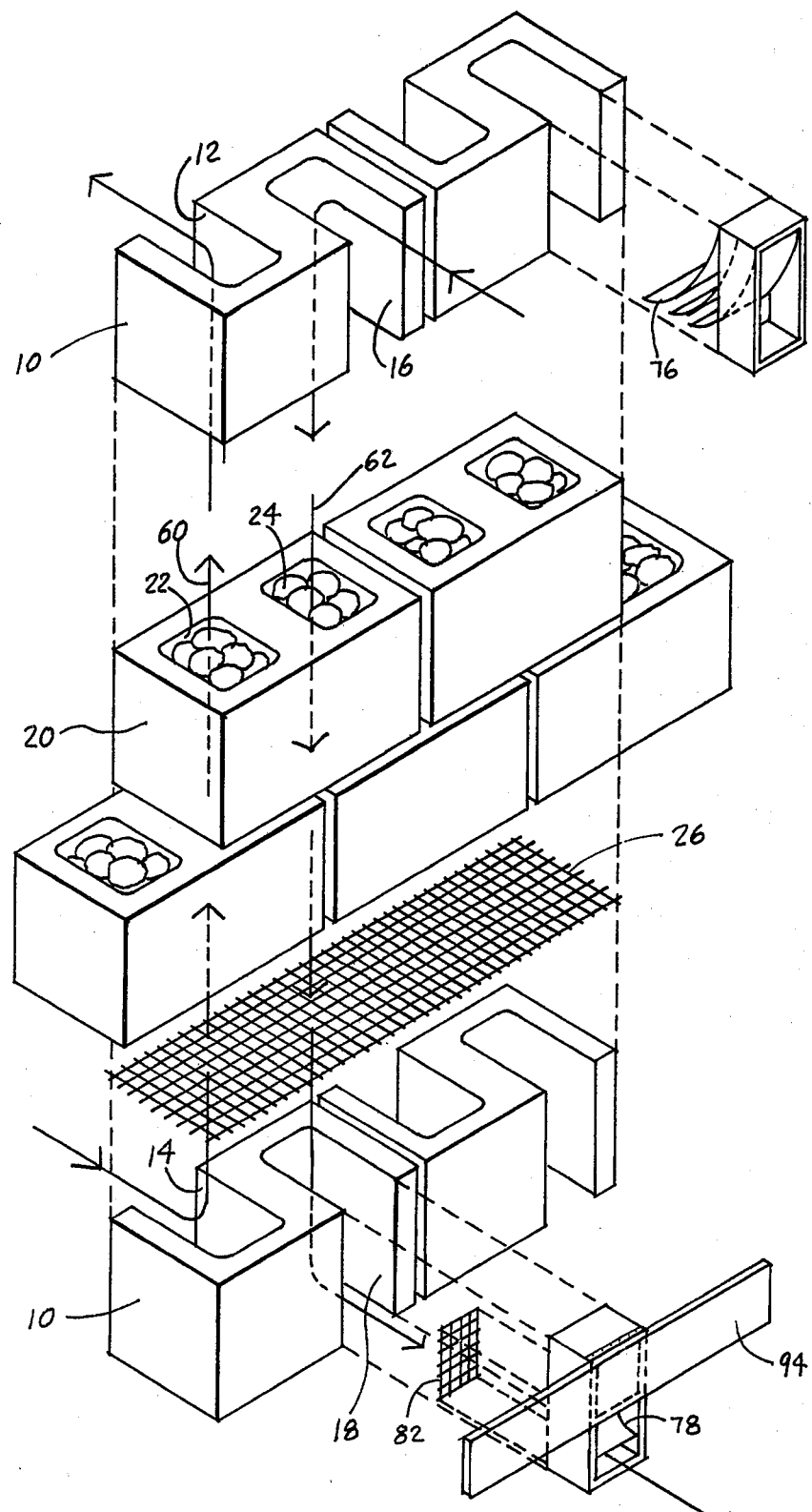
FIG. 7 is an exploded perspective view of a thermal storage siphon wall.

FIGS. 1 through 6 illustrate masonry blocks used in constructing a thermal storage siphon wall as illustrated in FIG. 7. The "S" shaped block 10 of FIG. 1 is used to provide ingress and egress for the flow of air vertically through the hollow vertical holes inside the block wall. The "S" block 10 laid at the top of the wall is positioned directly over a corresponding "S" block 10 at the bottom of the wall. Thus, the upper 12 and lower 14 vents in the same vertical air column open to the inside of the structure in this construction. Similarly, the upper 16 and lower 18 vents of the "S" block 10 in the adjacent air column open to the exterior of air collector side of the wall.

Between the upper and lower rows of "S" blocks are a plurality of intermediate rows of masonry blocks 20 with the holes 22 therein loosely filled with rock 24 so as to permit the flow of air therethrough in a vertical direction. A screen 26 may be placed on top of the bottom row of "S" blocks to support the individual columns of rocks and prevent them from dropping out of the wall through the vents 14 and 18.

Figure 3:
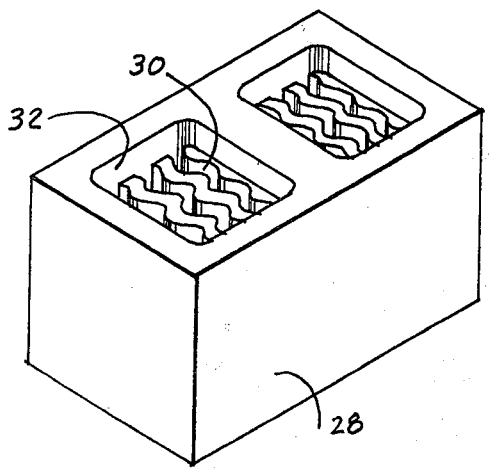

FIGS. 3, 5, 6, 11 and 12 illustrate alternate means of increasing the thermal storage capacity of the wall. In FIG. 3 the block 28 is formed with wavy vertical air channels 30 formed in the block, the block otherwise being solid. The wavy channel portion of the block is depressed 32 at the top of the block to provide a mixing chamber between each row of blocks in the vertical air column formed by the blocks.

In FIG. 5 the block 34 hole 36 is loosely filled with cylindrical metal, plastic or glass containers 38 containing water or a phase changeable thermal storage material such as Glauber's salt. The column of air passes vertically in the spaces 40 between the containers 38. The containers may be adhesively affixed within the block or rest upon the containers in the block therebelow. FIG. 6 illustrates a construction similar to FIG. 3 but with tubular conduits 42 formed in the block below a mixing chamber 44 adjacent the top of the block 46.

Figure 11:
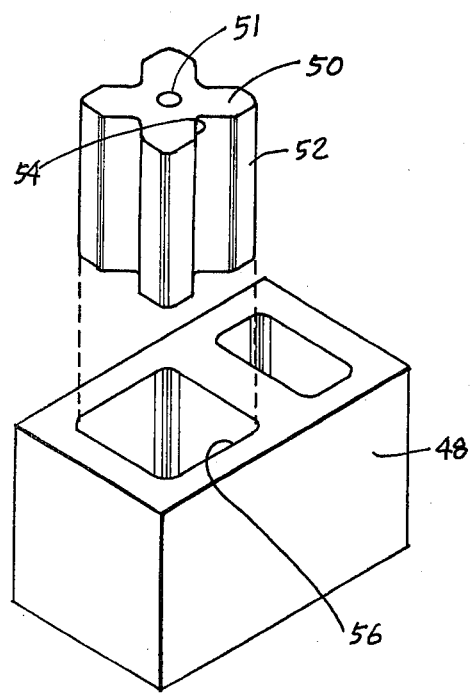
FIG. 11 illustrates a block with a separate thermal storage container.
Figure 12:
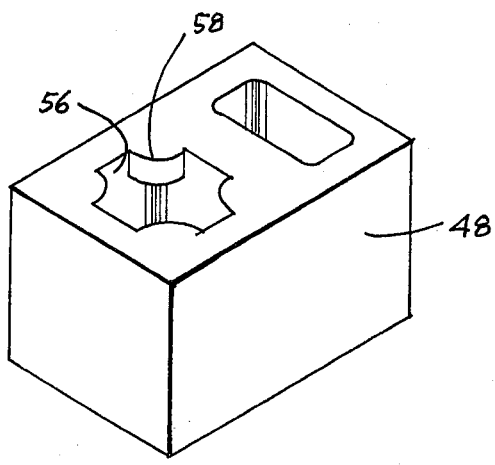
FIG. 12 is a bottom view of the block of FIG. 11.

FIGS. 11 and 12 illustrate a block 48 fitted with a lobed bottle or container 50 having a cap 51 for filling with water or a thermal storage phase changeable material. The lobes 52 form passages 54 through the hole 56 in the block 48. At the bottom of the hole 56 are tabs 58 adapted to support the container 50 and simultaneously provide an air mixing chamber beneath each container in a vertical air column. Alternatively, the lobed container 50 may be tapered toward the bottom to match a slight taper or draft of the walls of the hole 56. The taper eliminates the need for the tabs 58.

Figure 8:
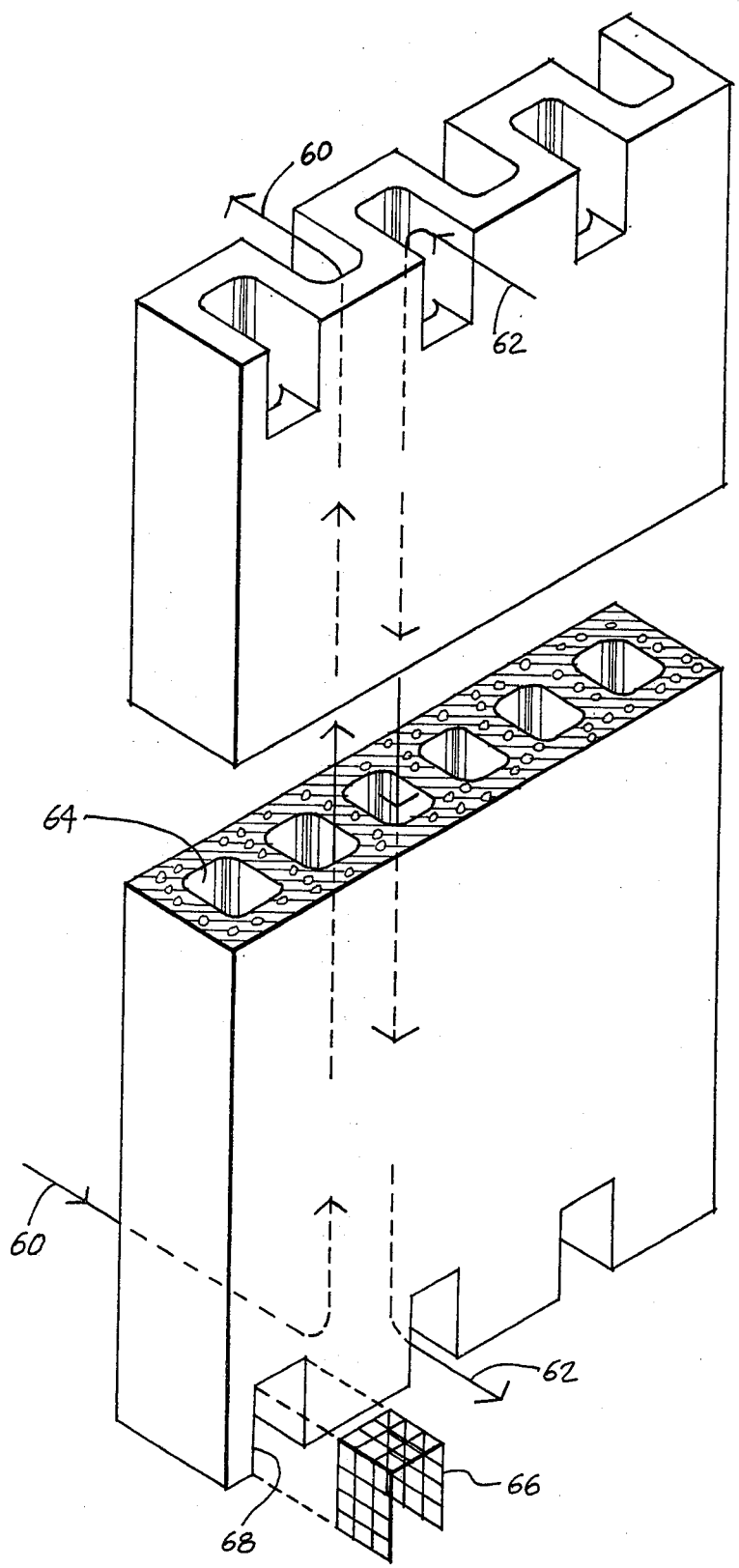
FIG. 8 is a perspective view of a precast concrete thermal storage siphon wall.

Returning to FIG. 7 the rows of arrows 60 and 62 illustrate that the construction operates as a counterflow heat exchanger with an integral thermal storage medium. FIG. 8 illustrates a precast concrete form of the wall of FIG. 7 in which the vertical air columns 64 may be filled with any of the thermal storage mediums discussed above. A wire mesh preform 66 may be located inside the lower vents 68 if loose rock is placed in the columns. Alternatively, the liquid filled containers of FIG. 5 or 11 in the form of long tubes may be dropped down into the columns 64.

Figure 9:
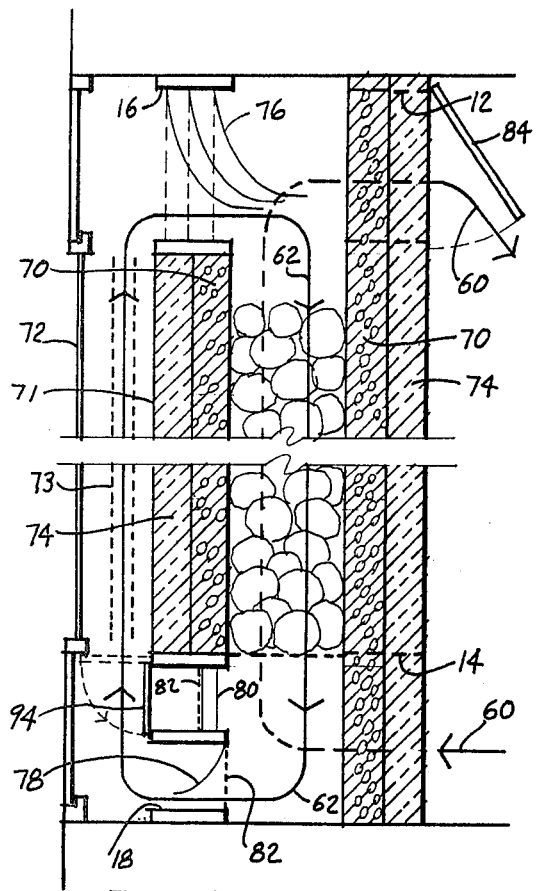
FIG. 9 is a schematic section of a thermal storage siphon wall illustrating winter daytime operation.
Figure 10:
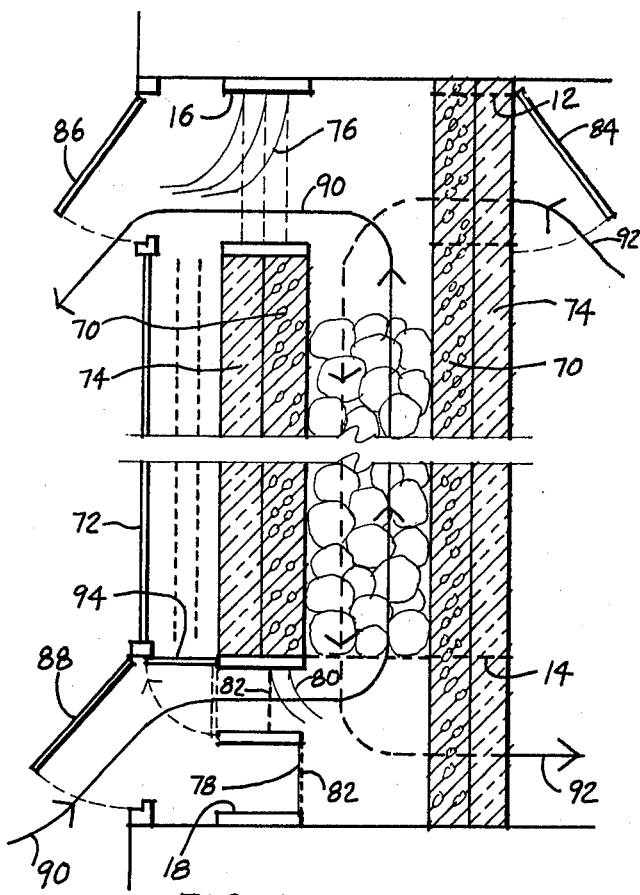
FIG. 10 is a schematic section of a thermal storage siphon wall illustrating summer nighttime operation.

FIGS. 9 and 10 illustrate the operation in winter daytime and summer nighttime. Additional features are shown in FIGS. 9 and 10 that were not included in FIGS. 7 and 8 for simplicity. The air flows indicated by arrows 60 and 62 are in adjacent vertical columns and there is no exchange of air therebetween, the schematics of FIGS. 9 and 10 being for illustrative purposes only (arrows 60 are shown dashed to indicate other column). The thermal siphon wall 70 is located behind exterior glazing 72 and covered with insulation 74.

In FIG. 9 solar radiation passing through the glazing 72 heats the air between the glazing and insulated wall 70. To improve the effectiveness of the air heating, the surface 71 opposite the glazing is black coated. Vertical black screens 73 are positioned between the glazing 72 and the surface 71. The heated air circulates through the wall 70 as indicated by the arrows 62 heating the thermal storage medium therein as well as the masonry of the wall itself. The upper vent 16 is equipped with a two way flapper valve 76. The lower vent 18 is equipped with a pair of oppositely actuated one way flapper valves 78 and 80. Wire mesh 82 is used to provide stops for the valves 78 and 80. The flapper valves are constructed of thin plastic film that can be opened by the thermally actuated movement of the air. Multiple films are used to create insulating air gaps therebetween when closed. The heating of the wall by the air currents 62 causes the air in adjacent columns to rise and heat the interior of the structure as indicated by arrows 60. The heating of the interior can be controlled by manually closing or opening the vent cover 84. Vent 84 is opened to bring heat into the room and closed to store heat in the wall 70.

In FIG. 10 summer night cooling is accomplished by opening the vent cover 84 and the exterior glazing vents or dampers 86 and 88. Cool night air enters the wall through vent 88 and valve 80 and exits through valve 76 and vent 86 cooling the wall 70 as it warms and rises as shown by the arrows 90. The cool wall causes a downward air current 92 in the adjacent column thereby circulating and cooling the interior air of the building. Closure of damper 84 causes the wall to be cooled and opening of damper 84 also cools the interior of the structure.

Thus, passive thermal siphon heating in the winter and cooling in the summer are accomplished by the construction disclosed above. To improve the effectiveness and decrease nighttime cooling of the wall in winter and daytime heating of the wall in the summer a damper 94 extends horizontally along the wall and covers the flapper valves 80. In winter this damper 94 in combination with one way valve 78 prevents reversal of air current 62. Thus, air current 60 may continue to remove heat from the thermal storage medium during the winter night to warm the interior of the structure.

Movement of the damper 94 to the summer position shown in FIG. 10 prevents movement of the air between the glazing 72 and the wall 70. Flapper valve 80 prevents reversal of air current 90. Thus, adjacent of the vents 86 and 88 and damper 94 control the heating and cooling of the siphon wall and adjustment of the vent cover 84 controls heating or cooling of the building interior rooms.

Figure 4:
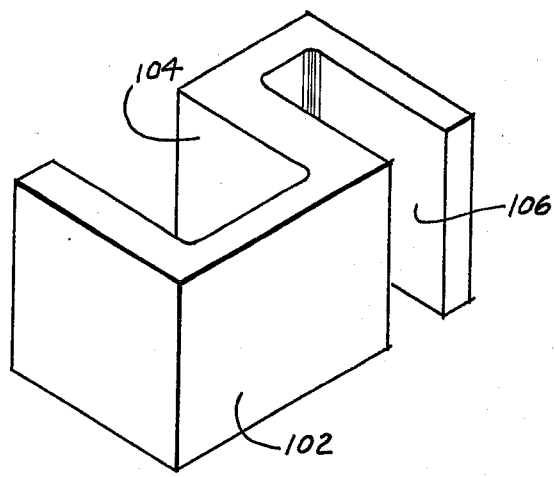
Figure 2:
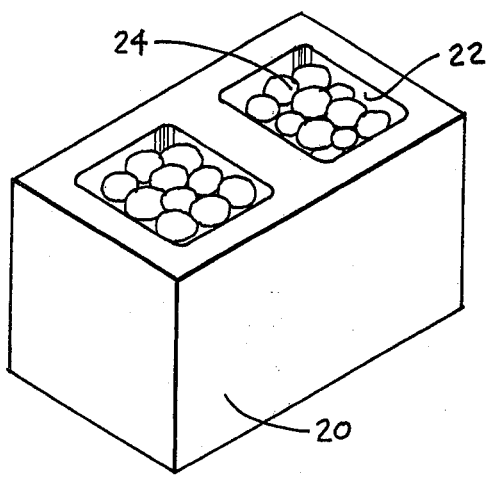

Returning to FIGS. 5 and 6, the blocks 34 and 46 each provide enlarged holes 36 and 96 for increased thermal storage means at one end of each block with corresponding reduced holes 98 and 100 at the other ends. Ingress and egress "S" shaped blocks 102 to match are formed as shown in FIG. 4 with a substantially larger vent 104 at one end and smaller vent 106 at the other end. The shape of the ingress and egress block 102 and the intermediate blocks 34 or 46 require that care be exercised in laying up the wall to assure that the proper block ends for matching holes are aligned vertically. Of course, the other thermal storage mediums such as the loose rocks or the precast construction can be utilized with the "S" shaped block construction. With the "S" construction the ingress and egress vents 104 communicate with the exterior to provide for the most effective storage of excess solar energy during winter daytime. The excess heat can then be drawn off during the night by the movement of air through the smaller ingress and egress vents 106 to the "S" shaped blocks 102.

Figure 14:
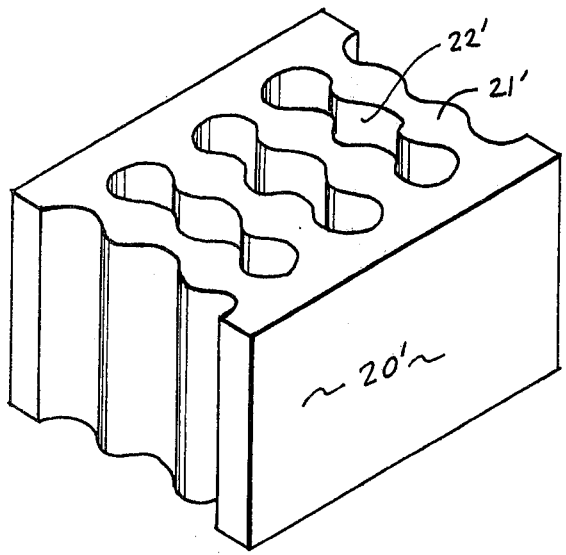
FIG. 14 is a perspective view of the block of FIG. 13 illustrating modifications for increased thermal effectiveness.
Figure 13:
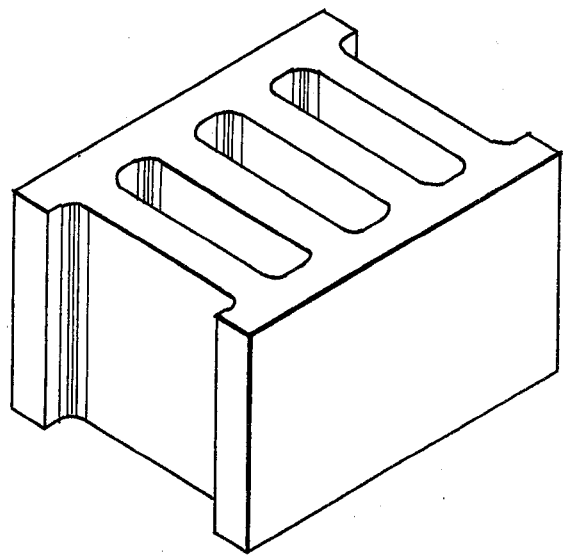
FIG. 13 is a perspective view of a conventional high load capacity structural block.

The blocks described above may be of nominal 8" by 8" by 16" size or nominal 8" by 12" by 16" size, however, for many applications nominal 8" by 12" by 16" blocks such as that shown in FIG. 13 are used for increased load carrying capacity. FIGS. 13 through 16 illustrate modifications to the blocks and vent rows of blocks at the top and bottom of the thermal storage siphon wall. FIG. 14 illustrates a modification of the block of FIG. 13 to provide increased air column wall surface area in the holes 22' and increased thermal storage capacity in the webs 21" of the intermediate block 20'.

Figure 15B:
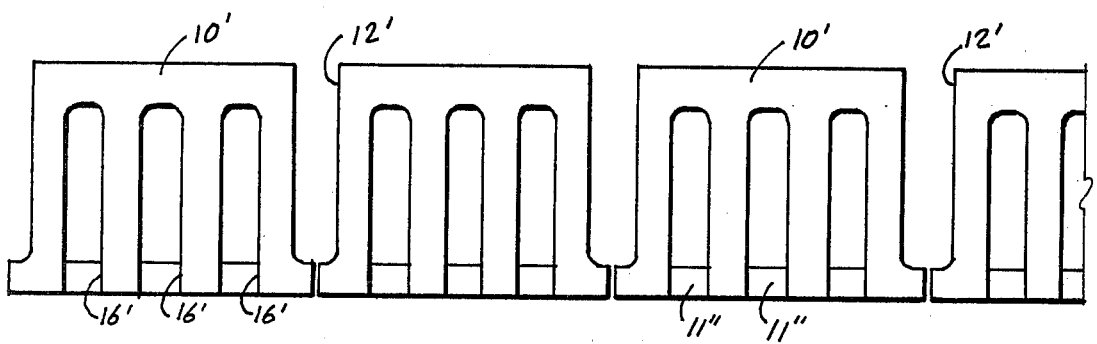
Figure 15A:
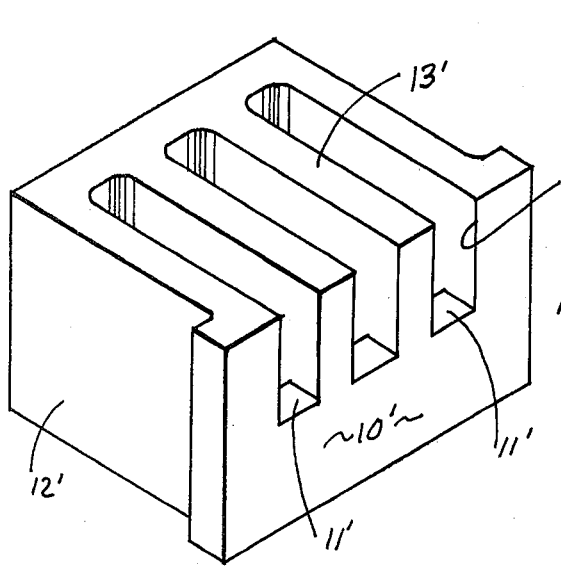
FIG. 15a is a perspective view of a high load capacity vent block.

FIG. 15a illustrates an "M" shaped vent block 10' suitable for upper or lower vent rows of blocks. FIG. 15b illustrates how the blocks are laid to provide exterior vents 16' and interior vents 12' at the block ends. The vents 16' extend only partially down the face of the block 10' to 11' thereby retaining a connection between the webs 13' of the vent block 10' at the vent face of the block. The vents 16' thereby do not substantially reduce the load carrying capacity of the vent block 10'.

Figure 16B:
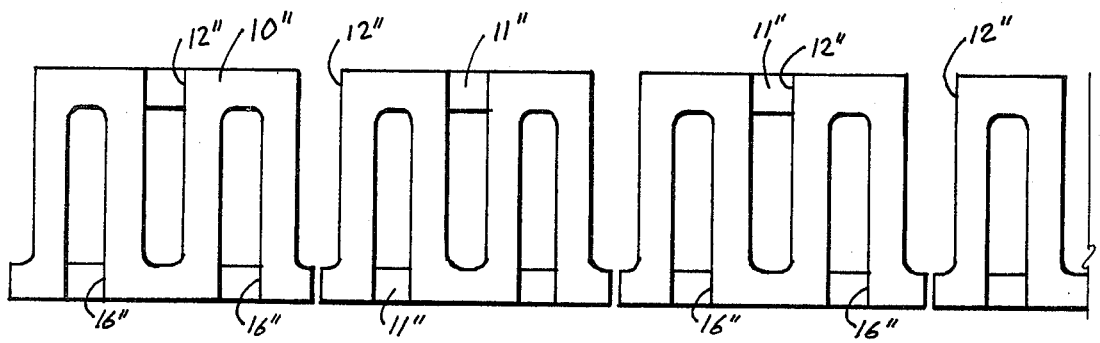
Figure 16A:
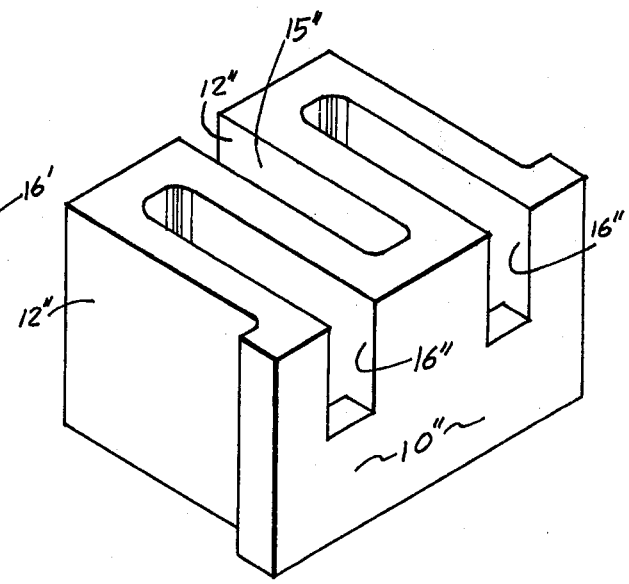
FIG. 16a is a perspective view of an alternate form of a high load capacity vent block.

The vent blocks 10' provide a three to one air column ratio between the air columns in communication with vents 16' and air columns in communication with vents 12'. FIGS. 16a and 16b illustrate a "W" shaped vent block modification 10" to provide an equal air column ratio. The center hole 15" is vented 12" through the same face as the end vents 12" between blocks. The other two holes vent through the opposite face at 16"'. To retain substantial strength the vents 12" and 16" extend only partially down the respective faces of the vent block 10" to 11".

Figure 17:
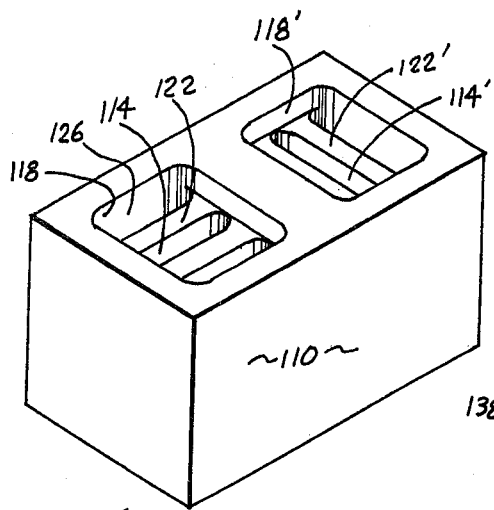
FIGS. 17 through 22 are perspective views of masonry blocks for an alternative version of the thermal storage siphon wall.
Figure 18:
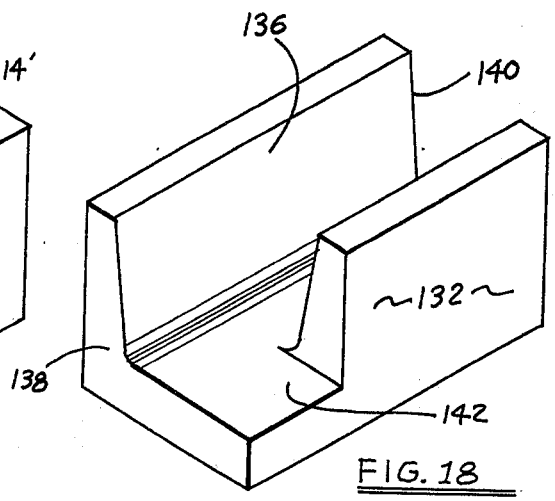
Figure 19:
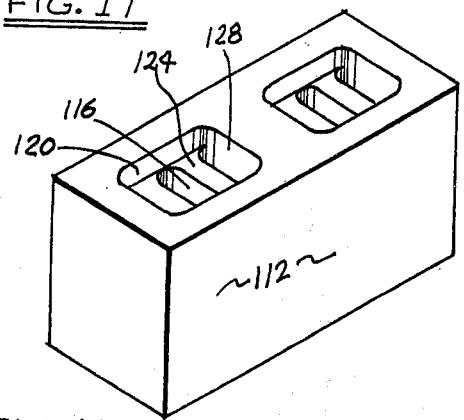
Figure 21:
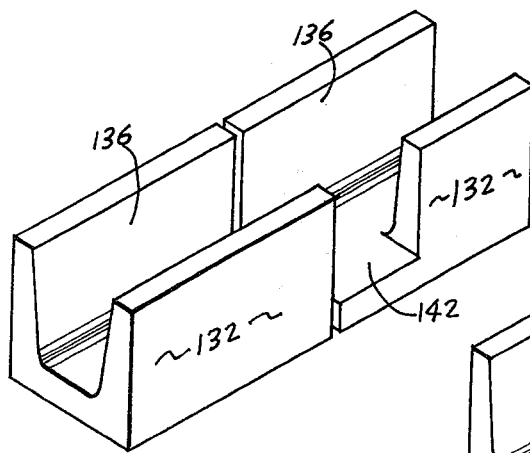
Figure 22:
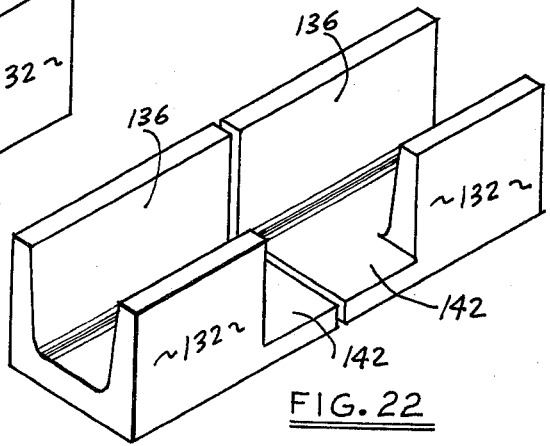
Figure 23:
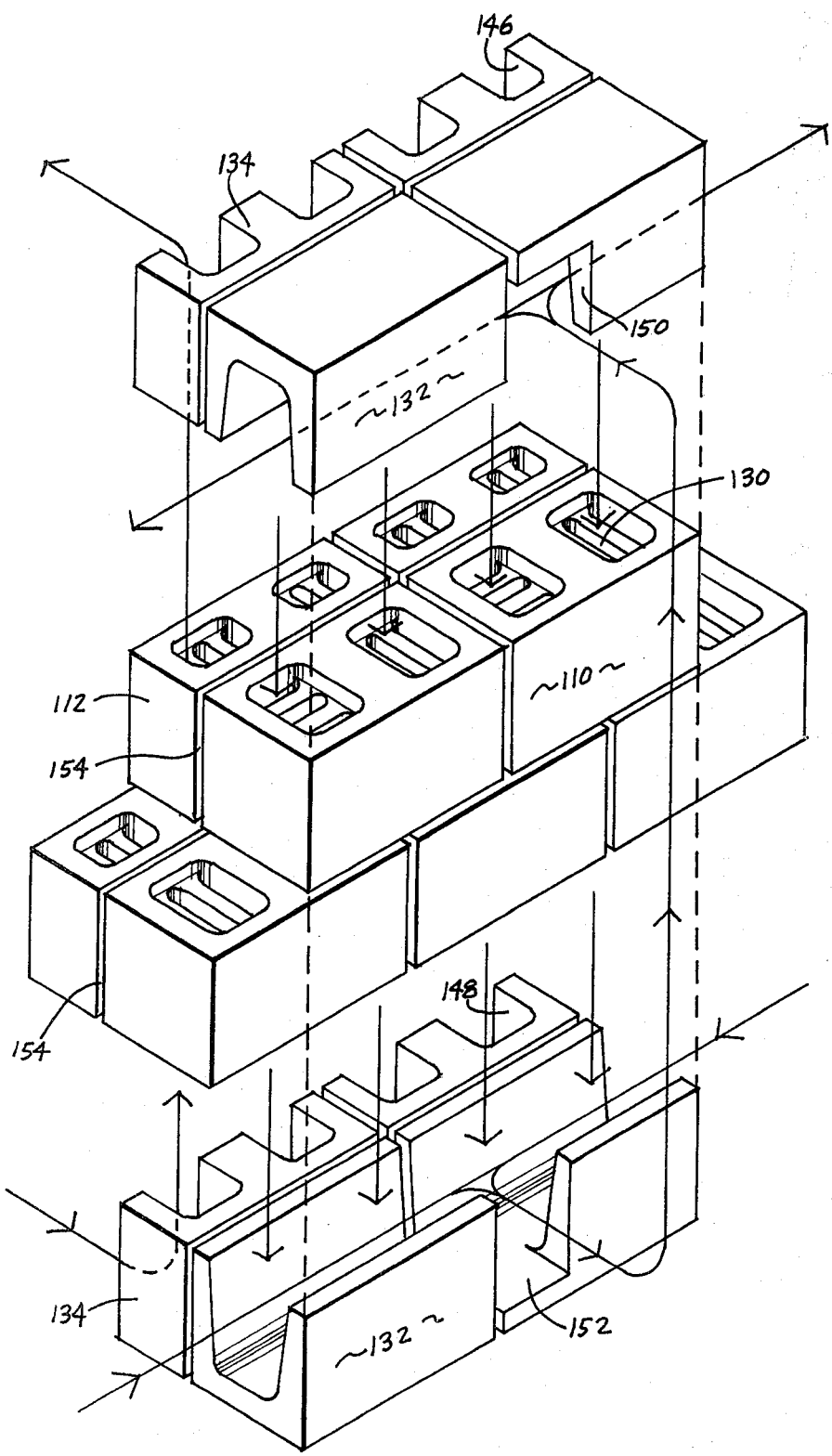
FIG. 23 is an exploded perspective view of an alternative version of the thermal storage siphon wall incorporating the blocks illustrated in FIGS. 17 through 22.

FIGS. 17 through 22 illustrate blocks modified for use with the double wall thermal storage and siphon units shown in FIGS. 23 through 26. The intermediate blocks 110 and 112 shown in FIGS. 17 and 19 include a plurality of passageways 114 and 116 within the holes 118 and 120 in the respective blocks. The webs 122 and 124 between the passageways 114 and 116 are depressed as shown to create mixing chambers 126 and 128 in each row of blocks as they are laid. In the block of FIG. 17 the webs 122 and passageways 114 of one hole 118 are perpendicular to the webs 122 and passageways 114' of the other hole 118'. Thus, when the blocks 110 are laid in typical staggered fashion as shown in FIG. 23 the passageways turn 90° from row to row in each vertical air column 130. The block of FIG. 17 is preferably of nominal 8" by 12" by 16" size and the block of FIG. 19 is preferably of nominal 8" by 8" by 16" size although other sizes may be selected.

Figure 20:
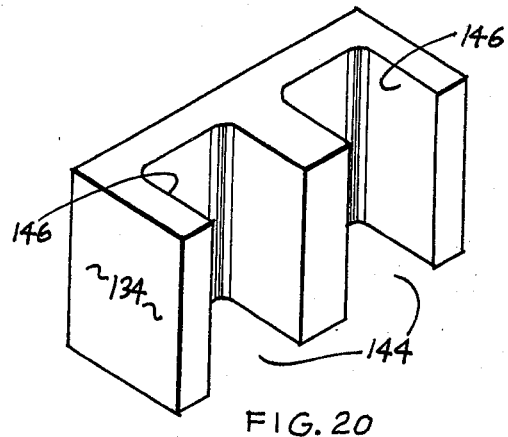

To provide ingress and egress to the columns of air provided by the passageways 114 and 116 in laid up walls, vent block 132 in FIG. 18 and vent block 134 in FIG. 20 are illustrated. Block 132 is formed in a generally longitudinal channel or "U" shape 136 open at both ends 138 and 140. In addition a vent opening 142 may be formed in the side of the channel 136 at one end or the other end of the block 132. As illustrated in FIGS. 21 and 22 the vent blocks 132 may be laid end to end to provide a duct with vent openings 142 as desired.

Vent block 134 is formed generally in the shape of an "E" with parallel vent openings 144 into the holes 146 of the block. As shown in FIG. 23 the vent blocks 134 are used to provide the top vents 146 and bottom vents 148 in the inside portion of the double wall constructed of intermediate blocks 112. Vent and channel blocks 132 are used to provide the top and bottom longitudinal ducts and top 150 and bottom 152 vents as required in the outside portion of the double wall constructed of blocks 110.

The double walls of FIGS. 23 through 26 provide a substantially increased thermal mass and a more evenly distributed heat input and heat output in comparison with the single wall concept of FIGS. 1 through 12. It is important than the joint 154 between mutually adjacent inner and outer wall blocks 112 and 110 respectively be fully mortared to avoid air gaps inside the wall. FIG. 24 illustrates a composite construction wherein the outer wall portion 110' is constructed of precast concrete with holes for the air columns 130' formed therein.

FIGS. 25 and 26 illustrate the operation of the double wall thermal storage and air siphons. The outer wall 156 is constructed of the blocks 110 or precast concrete 110' and the inner wall 158 of the blocks 112. The double wall is positioned behind glazing 160 and insulated on both sides at 162 and 164. The air heating chamber 166 may include black screens and the insulation 162 may be black coated as in FIGS. 9 and 10 as an option. In the winter daytime operation of FIG. 25 the air circulates through the air chamber 166 and the outer wall 156 as shown by arrows 168, heating the outer wall 156 and by thermal conduction the inner wall 158.

A one way flapper valve 170 is located in a portion of the lower vent 152 to prevent reverse siphon flow at night or during cloudy periods. Opening of the inner dampers 172 on the inner wall 158 permits air to circulate as shown by arrows 174 thereby heating the structure interior. Closing of the inner dampers 172 causes thermal storage of the heat within the wall until it is needed such as the following night. The inner dampers 172 can then be opened to heat the structure interior. The dampers may be manually or automatically operated in response to the structure interior temperature and the thermal siphon wall temperature.

FIG. 26 illustrates the summer nighttime operation of the double wall. The external dampers 176 are opened and the lower vent damper 178 raised as shown to permit cool night air as shown by arrows 180 to rise through outer wall 156 thereby cooling the outer wall 156 and by thermal conduction inner wall 158. With the inner dampers 172 open, the interior of the structure can be passively cooled as indicated by the arrows 182. With the inner dampers 172 closed the double wall can further be cooled to provide a heat sink when the inner dampers 172 are subsequently opened such as during the following daytime. In this embodiment the damper 178 is raised also to direct air into the wall 156 during nighttime circulation rather than through the air heating chamber 166. During summer daytime the damper 178 may be lowered to cover the flapper valve as in winter daytime, FIG. 25, however, the dampers 176 remain open. This directs outside air through the air collector 166 to cool the collector rather than through the wall 156.

Figure 27:
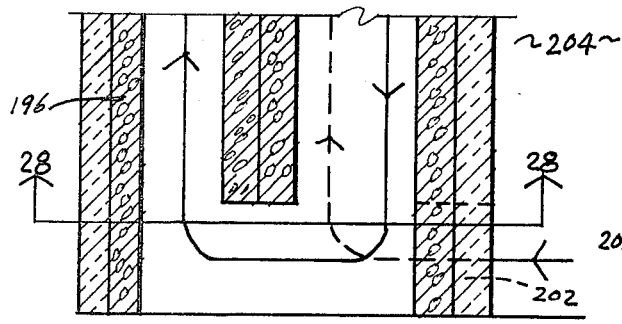
FIG. 27 is a schematic section of an alternative version of the thermal storage siphon wall for structures with basements.

FIG. 27 is a modification of the double wall that takes advantage of the basement of the structure to provide a taller air column and typically a greater temperature differential to drive the air siphon. Above the main floor 184 the wall 186 consists of a single block construction as shown in FIGS. 1 through 12 faced on the exterior with glazing 188 to enclose an air heating chamber 190. The wall 186 is faced on both sides with insulation 192 and includes rock storage 194 supported by screen 195 in the air columns to increase the thermal storage mass of the wall adjacent the main floor interior.

Figure 28:
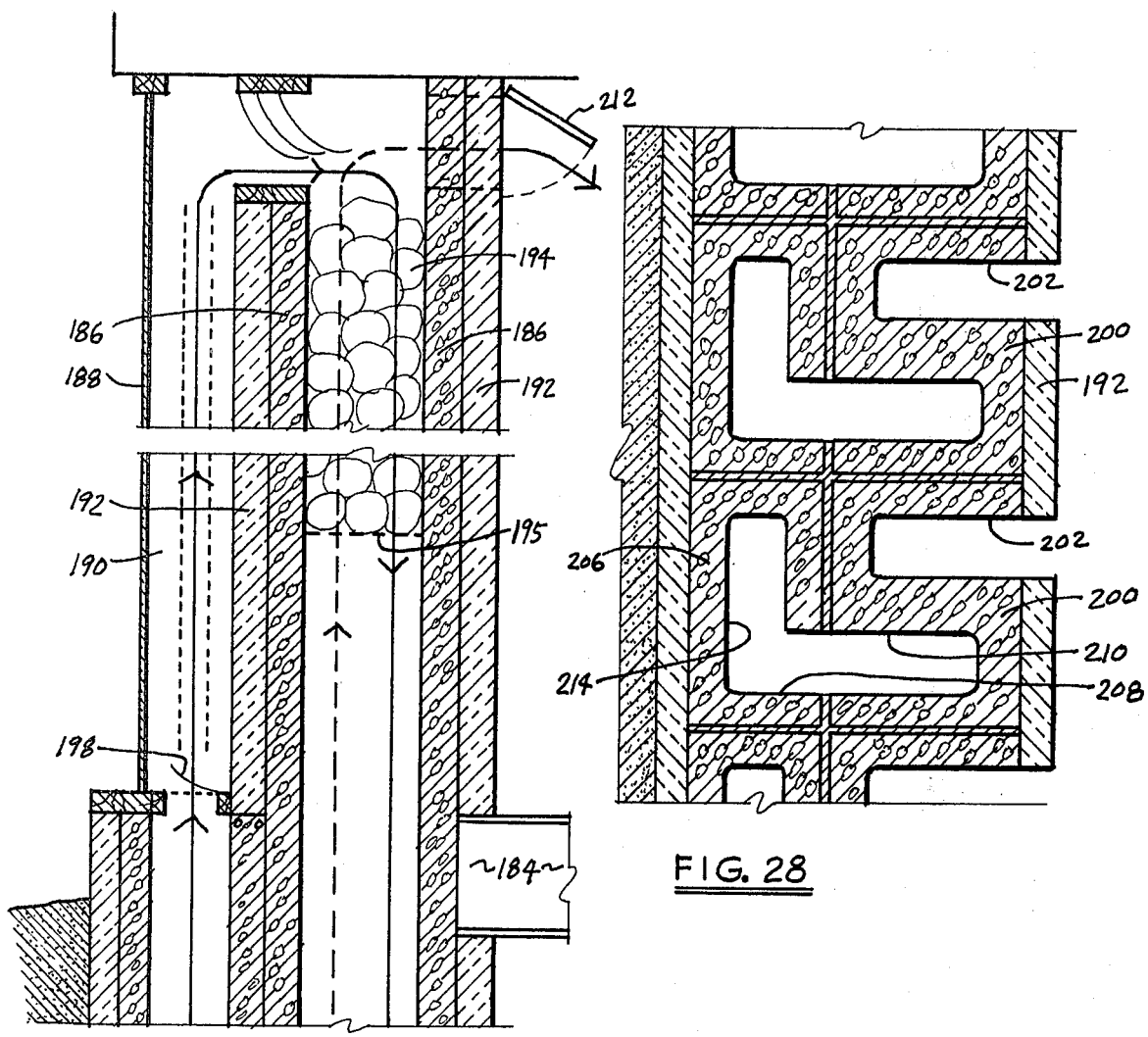
FIG. 28 is a basement level plan view section of the wall of FIG. 27 taken along the line 28—28.
Figure 29:
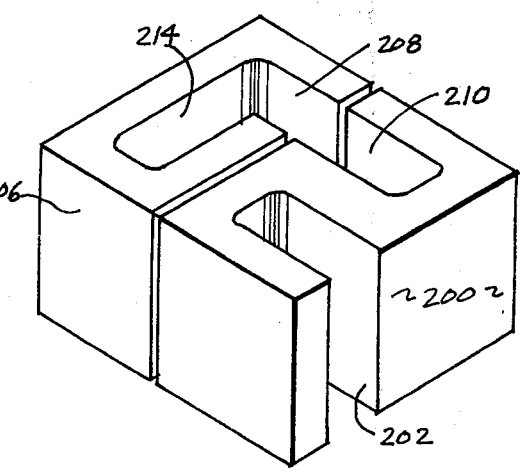
FIG. 29 is a perspective view of the masonry blocks for the wall of FIG. 27 at the basement level.

Below the main floor level the wall is of double wall construction using the blocks of FIGS. 17 and 19 with the outer wall 196 located below the air heating chamber 190 and constructed with the blocks 112 of FIG. 19. A one way flapper valve 198 prevents reverse flow through the air chamber when there is insufficient heating therein. At the bottom of the walls 186 and 196 a double row of blocks to provide communication between the inner and outer columns of air and to provide the bottom vent to the interior of the building are shaped and laid as shown in FIGS. 28 and 29. The "S" shaped block 200 provides an interior vent 202 communicating with the basement 204 of the structure. The "S" block 200 is below the wall 186. Below the wall 196 are "G" shaped blocks 206 having vents 208 that provide communication with the other vents 210 in the "S" blocks 200. The "G" block 206 vent 208 communicates with an elongated hole 214 in the block to supply both of the air columns above each "G" block 206 in wall 196.

Since the temperature of the floor of the basement 204 is typically the coldest in such a structure, the vertical temperature differential of the wall is maximized. The operation of the wall is similar to that of FIGS. 1 through 12 with side by side heat transfer in wall 186 to heat the interior of the structure when the inner dampers 212 are open and thermal storage when the inner dampers 212 are closed.

Figure 31:
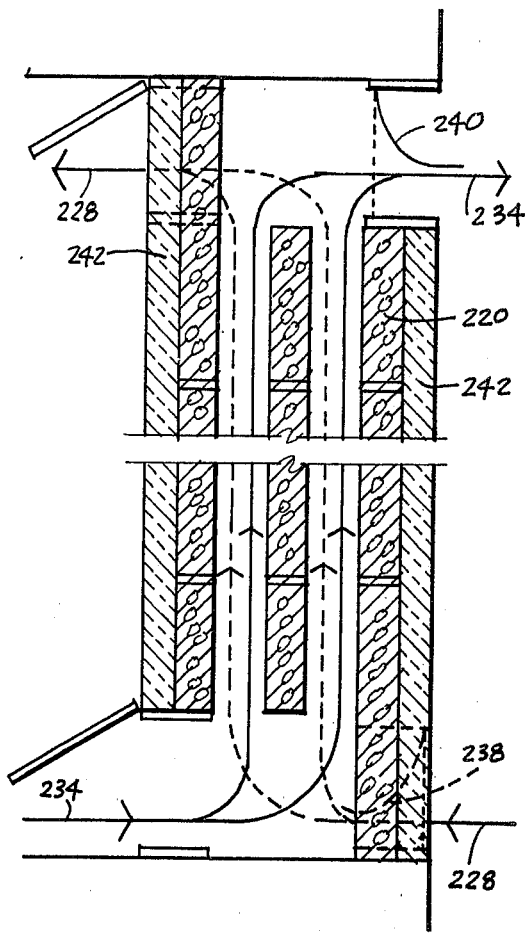
FIG. 31 is a schematic section of the thermal exchange siphon wall of FIG. 30.
Figure 30:
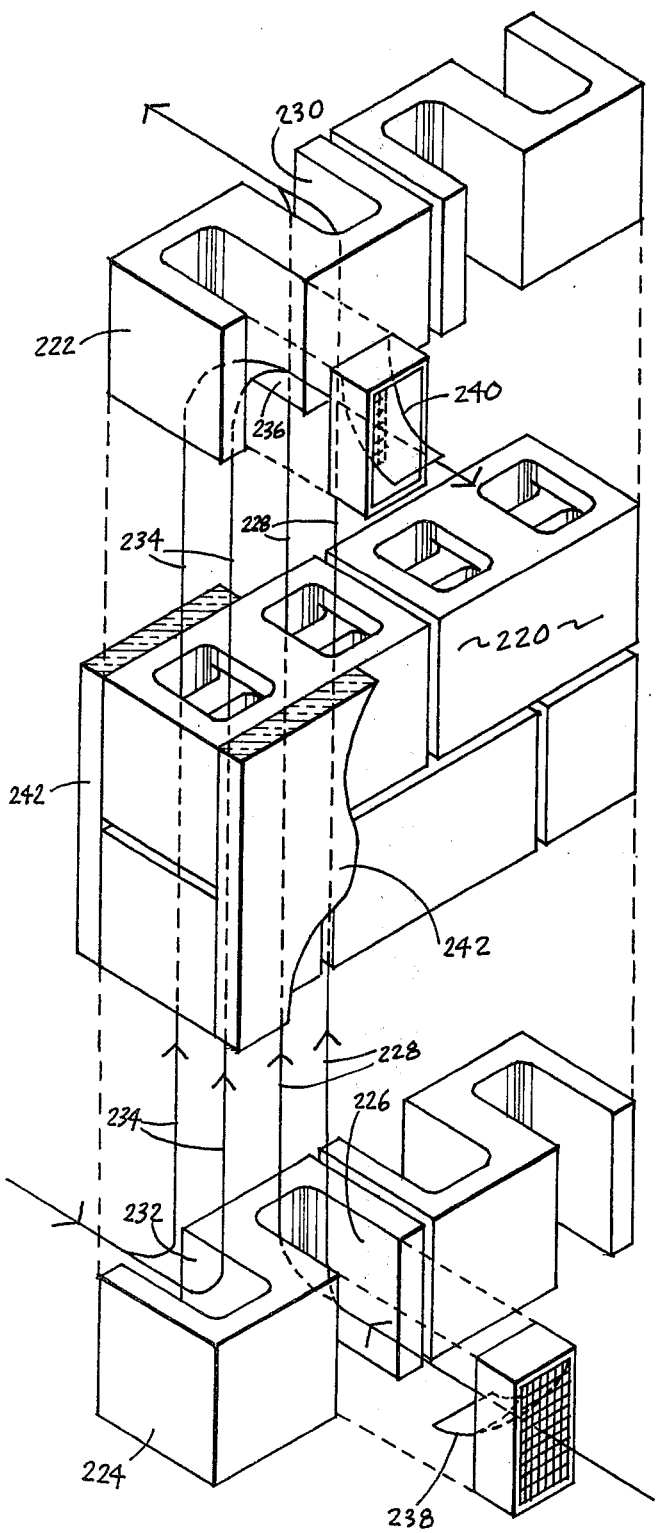
FIG. 30 is an exploded perspective view of a parallel flow thermal exchange siphon wall.

Two alternative modifications of the thermal storage and heat transfer wall to include air exchange are illustrated in FIGS. 30 through 33. In FIGS. 30 and 31 intermediate blocks 220 may be selected and constructed in the same manner as the intermediate blocks of FIGS. 1 through 12. The "S" shaped blocks 222 at the top of the wall are, however, reversed relative to the "S" shaped blocks 224 at the bottom of the wall. Thus, the outdoor air enters the wall through the vent 226, rises as shown by the arrows 228 as it is heated and exits through the vent 230 into the interior of the building. Simultaneously, interior air enters the wall through the vent 232, rises as shown by the arrows 234 as it is cooled and exits through the vent 236 to the outside of the building. Thus, the wall comprises a parallel flow heat exchanger with thermal storage provided by the mass of the wall to dampen sudden temperature fluctuations. One way flapper valves 238 and 240 are inserted in the vents to prevent flow reversal through the wall.

The wall is insulated on both sides as shown at 242 to improve the effectiveness of the heat exchanger and prevent heat loss through the wall when the air columns are not in operation. The air exchange wall is intended to reduce the amount of heat required to heat incoming fresh air by removing some of the heat from the stale air exhausted from the building and to accomplish the air exchange in a passive manner. The wall does not require substantial additional floor space and may be incorporated in a load bearing wall at various locations as desired. The addition of heat in any manner is required to heat the building and provides the required energy input to drive the passive air exchanger by providing an interior building temperature above the incoming air temperature at vent 230. Since this air is colder than the air at the vent 232 therebelow and colder than the air exiting at vent 236 a natural air flow will occur despite the cooling of the stale air as it rises 234 through the wall.

Figure 32:
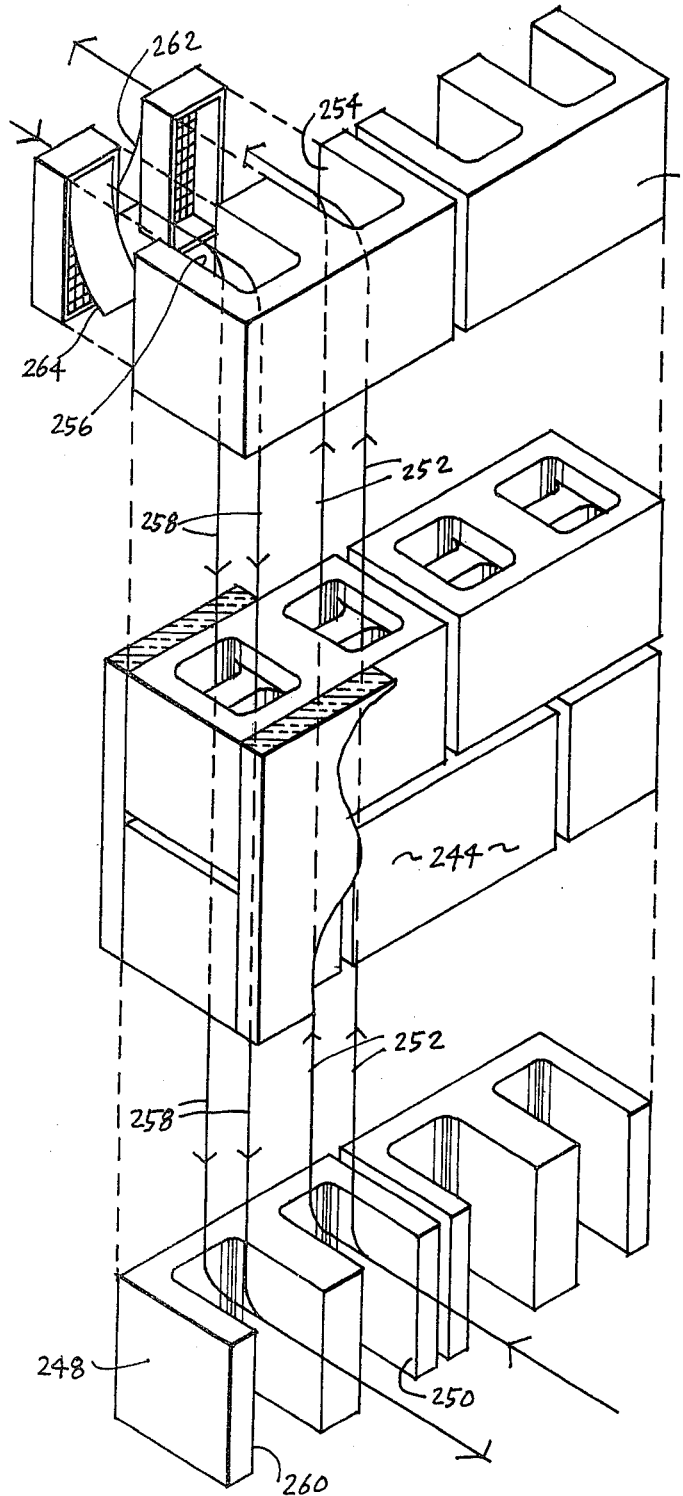
FIG. 32 is an exploded perspective view of a counterflow thermal exchange siphon wall.
Figure 33:
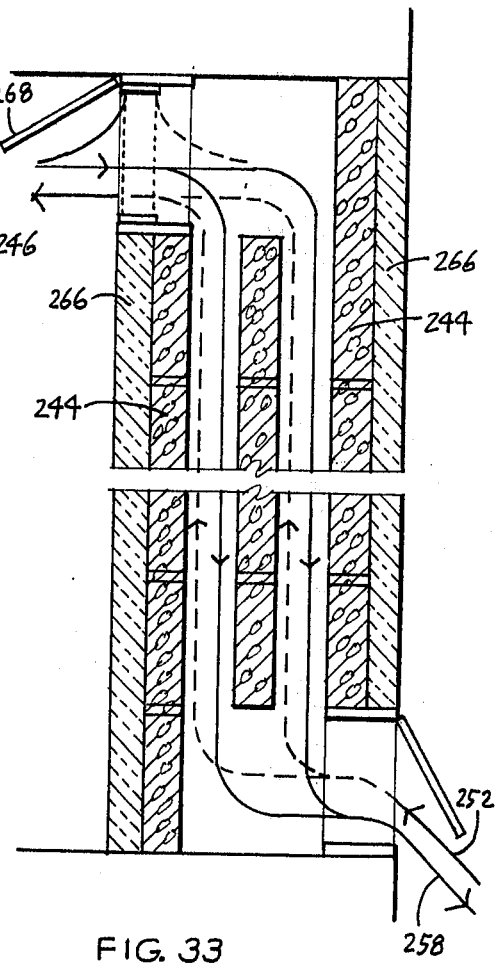
FIG. 33 is a schematic section of the thermal exchange siphon wall of FIG. 32.

The air exchange wall comprising a counterflow heat exchanger shown in FIGS. 32 and 33 also can utilize the intermediate blocks 244 of FIGS. 1 through 12. "E" shaped blocks 246 at the top of the wall are reversed in position from the "E" shaped blocks 248 at the bottom of the wall. Outside air enters the wall through vent 250, rises as it is heated as shown by arrows 252 and exits into the building through vent 254. Stale air enters the wall through vent 256, falls through the wall as shown by arrows 258 and exits through vent 260. One way flapper valve 262 and 264 are located in vents 254 and 256 to prevent flow reversals in the air columns. The wall is insulated as shown at 266 and manually controlled dampers 268 may be included to control the amount of air exchange occurring.

In the counterflow embodiment the stale air is cooling as it falls and the fresh air is rising as it is heated thus providing the driving force for the passive heat and air exchange wall. With the counterflow operation a larger temperature change can be accomplished for both the cooling and heating flows thereby providing a greater driving force for the air flow and more effective energy conservation. The parallel flow air exchange wall, however, provides more separation of the outgoing and incoming air streams, thus both parallel flow and counterflow air exchange embodiments possess advantages and disadvantages relative to each other.

Figure 34:
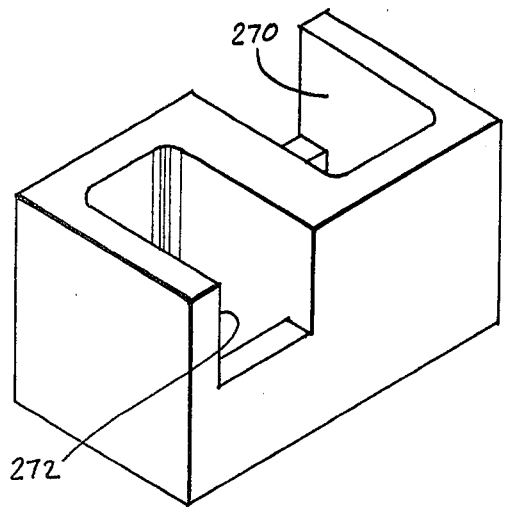
FIGS. 34 and 35 are perspective views of modified vent blocks for increased load carrying capacity.
Figure 35:
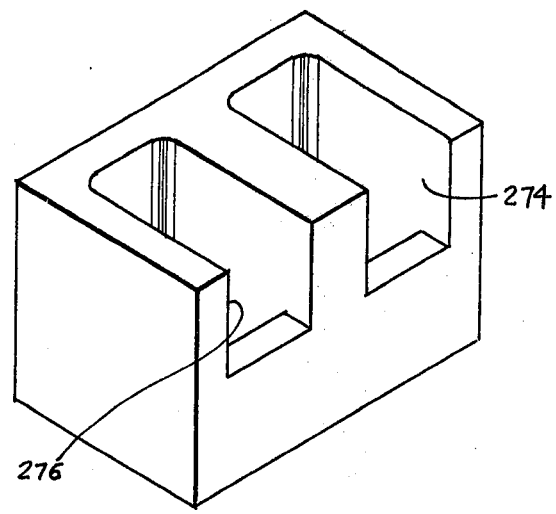

FIGS. 34 and 35 illustrate modifications to the "S" shaped and "E" shaped blocks to strengthen them in the same manner as the blocks shown in FIGS. 15a and 16a. In the "S" block of FIG. 34 vents 270 and 272 extend only part way down the front face and back face of the block. In the same manner the vents 274 and 276 of the "E" block of FIG. 35 extend only part way down the one face of the block. The holes in the blocks, however, extend vertically from the top to the bottom of the blocks.

Figures 36, 37, 38:
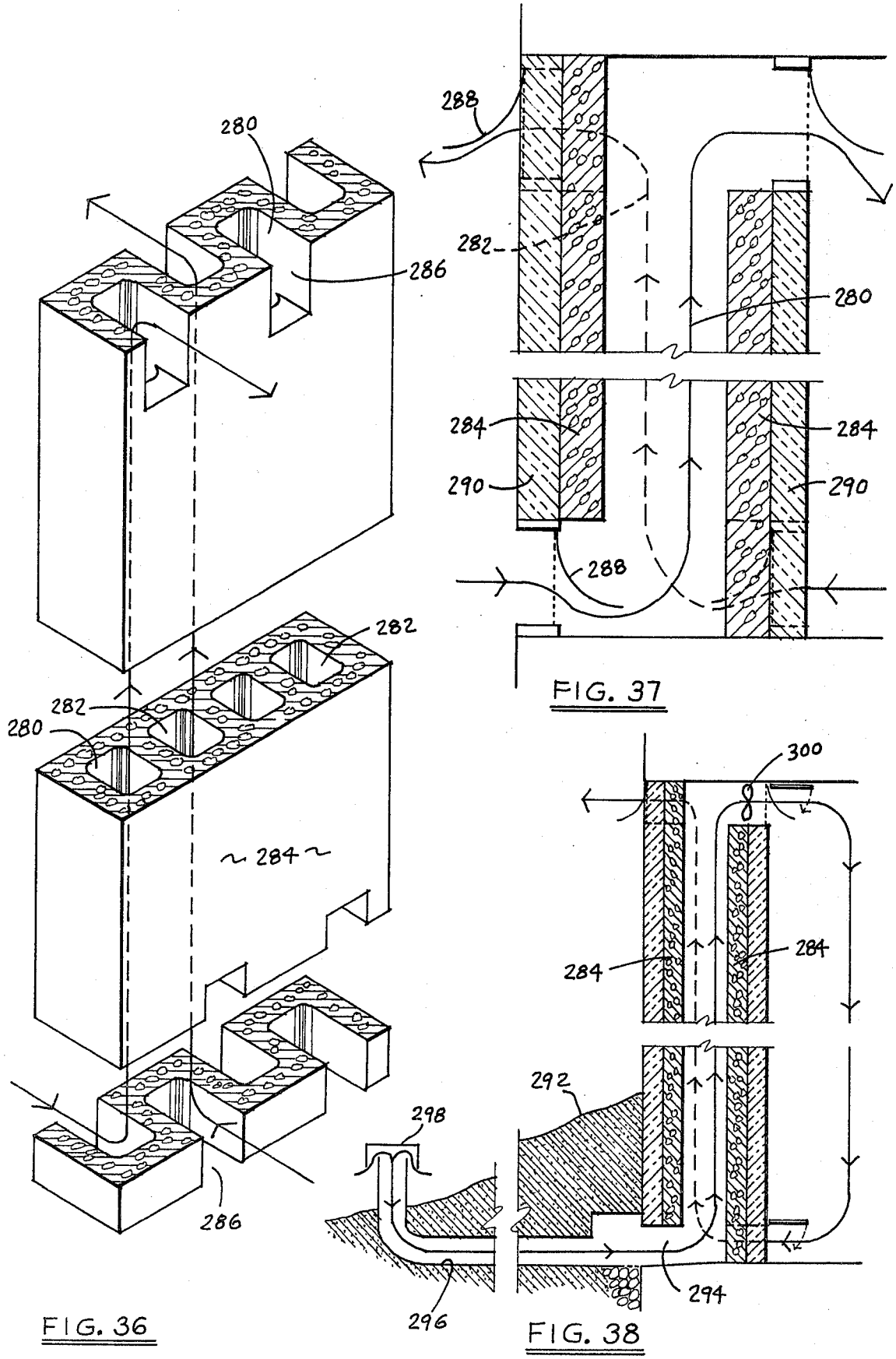
FIG. 36 is an exploded perspective view of a parallel flow thermal exchange siphon wall constructed of precast concrete.
FIG. 37 is a schematic section of the thermal exchange siphon wall of FIG. 36; and, FIG. 38 is a schematic section of the parallel flow thermal exchange siphon wall including ground path heat exchange and forced convection options.

FIGS. 36 and 37 illustrate a precast concrete alternative construction for the parallel flow air exchange siphon wall of FIGS. 30 and 31. A four air column unit is shown having two incoming air columns 280 and two outgoing air columns 282 formed within the precast wall sections 284. The vents 286 are integrally formed in the concrete wall section. Flapper valves 288 may be inserted into the vents 286 as appropriate to prevent reverse siphon flow through the air columns.

Insulation 290 is adhesively affixed to the exterior and interior of the precast section 284. As is apparent, this precast unit is ideally suited for mass production in standard sized units for housing, commercial and industrial structures and can form a part of the load bearing building walls. The precast unit can be formed with more or less than four air columns and the vents can be modified to provide the counterflow air exchange siphon of FIGS. 32 and 33.

A further modification of the parallel flow air exchange siphon wall is illustrated in FIG. 38. The wall 284 extends below ground 292 and the external vents 294 are in communication with an underground conduit 296 and above ground intake 298. The underground conduit allows the mass of the ground to pre-warm incoming air in exceptionally cold weather and to pre-cool incoming air in exceptionally hot weather. The embodiment also includes an optional vent fan 300 to overcome the additional flow resistance of the extended conduit and the decreased temperature differentials between the incoming and outgoing air streams.

What is claimed is:

1. A building wall for thermal storage and passive air siphon heat exchange comprising a plurality of hollow vertical parallel columns formed inside a wall of sufficient mass for significant thermal storage,
   vent means at the top and bottom of a first column, said vent means of the first column communicating with the interior of a building,
   vent means at the top and bottom of a second column adjacent the first column, said vent means of the second column adapted to communicate with an external solar air collector,
   said wall providing heat exchange between the air in the adjacent columns when the air is moving in both columns, said movement of the air in one column caused primarily by the exchange of heat with the other column of moving air, and said wall providing thermal storage or thermal release when air is moving in only one of the adjacent columns, and
   a bi-directional valve in the upper vent and a uni-directional valve in the lower vent of the column in communication with the external air collector.

2. The wall of claim 1 including exterior insulation on said wall and glazing spaced from said exterior insulation to enclose an external solar air collector in communication with the vent means of the second column.

3. The wall of claim 2 including interior insulation on said wall and at least one damper adapted to control the air in the first column.

4. The wall of claim 1 including a damper controlled second uni-directional valve in the lower vent of the column in communication with the external air collector.

5. The wall of claim 4 including at least one dampered external vent communicating between the external air collector and the outdoors.

6. The wall of claim 1 including additional thermal storage means located within at least some of the vertical columns.

7. The wall of claim 6 wherein the additional thermal storage means comprises rocks loosely stacked to permit air flow therethrough and located in at least some of the columns.

8. The wall of claim 6 wherein the additional thermal storage means comprises containers filled with a liquid or phase changeable material.

9. The wall of claim 8 including air mixing chambers located between the containers.

10. The wall of claim 6 wherein the additional thermal storage means is integral with the material of the wall and forms column passages sinuous in cross-section.

11. The wall of claim 1 wherein the vertical columns are formed with a tortuous path to provide maximum surface area contact with the moving air in the column.

12. The wall of claim 1 comprising reinforced precast concrete.

13. The wall of claim 1 comprising a plurality of hollow masonry blocks laid in rows, the vents being formed from "S" shaped blocks laid above and below the rows of hollow masonry blocks.

14. The wall of claim 13 wherein one of the adjacent columns is of a smaller cross-sectional area than the other column.

15. The wall of claim 1 wherein the plurality of vertical air columns are arranged in dual rows with one row vented to the interior of a building and the other row vented to an external air collector.

16. The wall of claim 15 wherein at least one common duct provides communication among the air columns of one row.

17. The wall of claim 15 wherein at least one row of air columns is formed of precast concrete.

18. The wall of claim 1 including additional thermal storage means comprising a container filled with a thermal storage material and located within at least some of the vertical columns, said container having vertical concave depressions formed in the sides thereof.

19. The wall of claim 18 wherein said container is slightly tapered downwardly to match a slight draft in the walls of the corresponding vertical column and be supported thereby.

20. The wall of claim 1 wherein the external air collector is located above a first row of vertical air columns communicating therewith and adjacent a second row of vertical air columns having at least some thereof communicating with the first row of air columns and with the air collector.

21. The wall of claim 20 wherein the first row of air columns lies substantially below ground level.

22. The wall of claim 20 wherein the second row of vertical air columns communicates with the interior of the building.

* * * * *

UNITED STATES PATENT AND TRADEMARK OFFICE
CERTIFICATE OF CORRECTION

PATENT NO. : 4,411,255

DATED : October 25, 1983

INVENTOR(S) : Kenneth S. Lee

It is certified that error appears in the above-identified patent and that said Letters Patent are hereby corrected as shown below:

Col. 1, line 49: Correct "to" to read --in--.

Col. 2, line 22: Correct "siphon" to read --siphons--.

Col. 2, line 29: Correct "valve" to read --valves--.

Col. 2, line 66: Correct "optimal" to read --optional--.

Col. 4, line 15: Correct "of" first occurrence to read --or--.

Col. 4, line 63: Correct "FIG." to read --FIGS.--.

Col. 5, line 55: Correct "adjacent" to read --adjustment--.

Col. 5, line 63: Correct "corresponding" to read --correspondingly--.

Col. 6, line 11: Correct "to" to read --of--.

Col. 6, line 22: Correct "21" " to read --21'--.

Col. 8, line 32: Correct "of" to read --at--.

Col. 9, line 20: Correct "valve" to read --valves--.

Signed and Sealed this

Twenty-sixth Day of June 1984

[SEAL]

Attest:

GERALD J. MOSSINGHOFF

Attesting Officer

Commissioner of Patents and Trademarks